United States Patent [19] [11] 4,287,873
Goins et al. [45] Sep. 8, 1981

[54] OVEN DOOR HINGE

[75] Inventors: James R. Goins, Ten Mile; Hubert H. Cardin, Athens, both of Tenn.

[73] Assignee: White Consolidated Industries, Inc., Cleveland, Ohio

[21] Appl. No.: 146,038

[22] Filed: May 2, 1980

[51] Int. Cl.$^3$ .......................... F23M 7/00; E05F 1/12; A22C 21/00

[52] U.S. Cl. .................................... 126/194; 126/191; 49/386; 16/180

[58] Field of Search ........................ 126/191, 192, 194; 48/386; 16/180, 181

[56] References Cited

U.S. PATENT DOCUMENTS

| | | | |
|---|---|---|---|
| 3,155,088 | 11/1964 | Barber | 126/194 |
| 3,398,735 | 8/1968 | Barber | 126/194 |
| 4,001,973 | 1/1977 | Rice | 126/194 |

*Primary Examiner*—Albert W. Davis

*Attorney, Agent, or Firm*—Pearne, Gordon, Sessions, McCoy & Granger

[57] ABSTRACT

A pair of spring-loaded oven door hinge mechanisms, mounted on a domestic range body and located at the lower corners of a counterbalancing oven door lock in a partially open position upon removal of the oven door to preclude accidental tripping of the non-counter-balanced hinge mechanisms. Reinstallation of the counterbalancing oven door unlocks the spring-loaded hinge mechanisms to permit normal oven door movement between open and closed positions. Each hinge mechanism includes a fixed roller normally engageable with a hinge blade projection to provide a broil position detent mechanism. The fixed roller snaps into a deep recess or notch in a movable hinge blade upon removal of the oven door to provide positive locking of the hinge blade to maintain the associated hinge mechanism in a partially open position, thereby facilitating oven door reinstallation.

11 Claims, 5 Drawing Figures

OVEN DOOR HINGE

BACKGROUND OF THE INVENTION

The present invention relates in general to a mounting means for domestic range oven doors that are user-removable at a partially open position, such door removal facilitating oven cleaning. More particularly, the present invention is directed to a spring-loaded hinge mechanism counterbalanced by a removable oven door, the hinge mechanism locking in position upon removal of the oven door to preclude accidental tripping of the non-counterbalanced, partially open, spring-loaded hinge mechanism.

Many conventional removable oven doors are lifted off a pair of bottom corner supporting hinge mechanisms by first positioning the door at its partially open broil position and then lifting up on the oven door to disengagingly pull it off the hinge mechanisms supported by the range body. Most prior art removable oven door hinge mechanisms have relied solely on a hinge associated broil position establishing detent means to maintain the spring-loaded hinge mechanisms in a partially open condition upon oven door removal. Such broil position establishing detent means can easily be overriden by, for example, accidental bumping of the hinge structure. Without the counterbalancing effect of the oven door, the hinge mechanism will forcefully snap shut, with probable damage to enameled range body surfaces around the hinge mechanism. Further, the now closed hinge must be forced open to its partially open position before reinstallation of the oven door can be effected, and this is difficult to do because of the high spring force of the counterbalance spring and the short lever arm of the hinge link.

U.S. Pat. Nos. 3,003,495; 3,191,217; 4,001,973; 4,138,988; and 4,194,321 recognize the above-noted problem and each provides means for precluding accidental closing of spring-loaded oven door hinges after an associated oven door is removed. However, the mechanisms illustrated by these patents are undesirably complex and costly and generally employ a stop that limits only closing, but not opening, movement of the hinge link. Furthermore, most of these mechanisms use a separate moveable stop member which can still be accidentally disengaged to allow the hinge link to move to the closed position.

SUMMARY OF THE INVENTION

In accordance with the present invention, a hinge mechanism includes a fixed stop member and a hinge link having one end pivotally mounted at a location fixed relative to the stop member, the hinge link being pivotally movable toward and away from the stop member.

A hinge blade configured as a bell crank is pivotally mounted to the hinge link and includes one bell crank arm biased toward and engageable with the stop member as the hinge link pivotally moves toward and away from the stop member. The one bell crank arm also includes a recess sized to receive the stop member.

The other bell crank arm of the hinge blade is normally constrained in movement to a position where the recess is held out of engagement with the stop member. Upon the elimination of the constraint on the other bell crank arm, so that free movement of the bell crank is permitted, the stop member can engage the recess to lock the hinge mechanism in position.

The claimed structure in accordance with the present invention finds particularly advantageous application as a door hinge mechanism for pivotally mounting a removable oven door of a domestic range.

BRIEF DESCRIPTION OF THE DRAWINGS

Other objects and a fuller understanding of the invention may be had by referring to the following description taken in conjunction with the accompanying drawing.

DETAILED DESCRIPTION OF THE INVENTION

Initially, it is noted that the hinge mechanism, in accordance with the present invention, while having preferred usage as a removable oven door mounting hinge, is recognized to have other applications wherein a hinge structure, lockable upon removal of a hinged element, is desirable.

Figure 1:
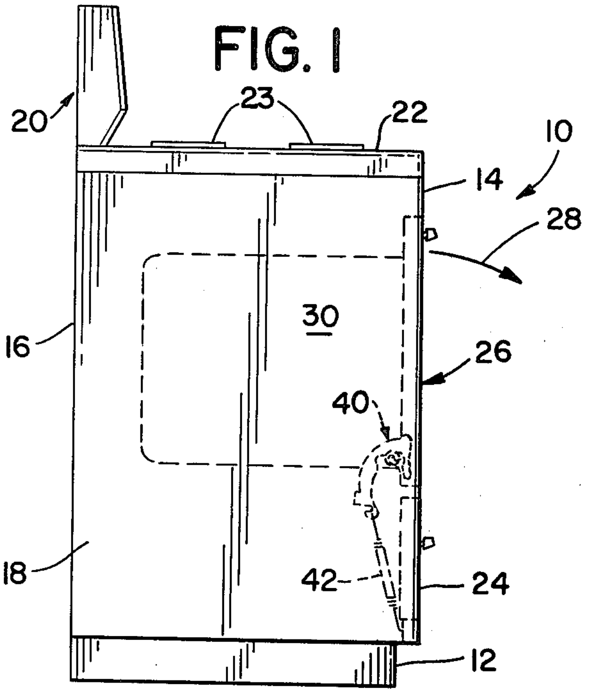
FIG. 1 is a side view of a domestic range including a removable oven door pivotally mounted to the range by a pair of spring-loaded hinge mechanisms in accordance with the invention.

Turning to FIG. 1, there is schematically illustrated in side elevational view a free-standing domestic range 10 incorporating a pair of hinge mechanisms 40 (only one shown) in accordance with the present invention. The domestic range 10 includes a supporting base portion 12 which is of a generally rectangular geometry when viewed in plan, such base portion 12 constituting the lower portion of a range body including a front range body wall 14, a back range body wall 16 and a pair of side range walls 18 (only one illustrated). The walls 14, 16, 18 are typically formed of sheet metal and, taken together, form a boxlike cabinet for supporting a range control panel 20 and a burner providing cooking surface 22 including, for example, four electric resistance heating elements 23 (only two illustrated) or, in the alternative, four gas burner units. The range control panel 20 is typically located at the back portion of the burner providing cooking surface 22 as illustrated, such control panel including customary burner and oven controls for regulating the temperature thereof.

Located generally coplanar with the front range body wall 14 is a cooking utensil drawer 24 and a removable oven door 26, the drawer 24 and the door 26 being of generally rectangular shape as viewed from the front of the range 10. The drawer 24 functions in the conventional manner as a storage area for cooking utensils, while the removable oven door 26 has its lower corners supported by a pair of hinge mechanisms 40 in accordance with the present invention. The door 26 pivotally swings away from the open face of a cubical oven cavity 30 in a direction indicated by arrow 28, the door pivoting about an axis running generally parallel to and located adjacent to its bottom edge. Each hinge mechanism 40 is spring-loaded by an appropriate tensioned spring 42, the weight of the door 26 acting to counterbalance the force of the spring 42 on the hinge mechanism 40 to facilitate opening and closing of the door 26. The domestic range geometry illustrated in FIG. 1 and, in particular, the opening and closing movements of the door 26 are well known in the art.

Figure 2:
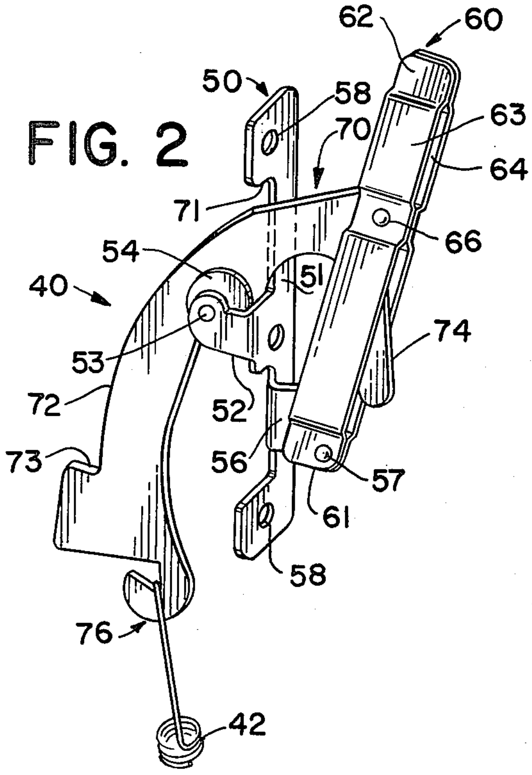
FIG. 2 is a perspective view of a hinge mechanism in accordance with the invention, the hinge mechanism being locked in a partially open position.

With particular reference to FIG. 2, and by way of example, a right side hinge mechanism 40 (right side of the range 10 as viewed from its front) is shown separate from the range body 10 illustrated in FIG. 1 but for the tensioned spring 42. It is to be noted that the left side hinge mechanism 40 (shown in phantom in FIG. 1) is generally identical to the illustrated right side hinge mechanism of FIG. 2.

In accordance with the present invention, the hinge mechanism 40 includes a mounting plate 50 which has a front wall engageable plate portion 51, a stop supporting arm 52, and a hinge link pivot-providing arm 56. The stop supporting arm 52 and the hinge link pivot-providing arm 56 are generally parallel to each other and extend in opposite directions generally perpendicular to the front wall engaging plate portion 51. Further, the stop supporting arm 52 is generally located at a center portion of the front wall engageable plate portion 51, while the hinge link pivot-providing arm 56 is located in the lower half of the plate portion 51 at a point spaced below the stop support arm 52 when the hinge mechanism 40 is mounted as illustrated in FIGS. 1 and 2.

The stop supporting arm 52 includes generally at its distal end an axis of rotation defining first pin 53 which supports a stop member 54 illustrated in the preferred form of a roller rotatable on the first pin 53, the axis of the pin 53 being parallel to the plane including the front wall engageable portion 51. The hinge link pivot-providing arm 56 includes an axis of rotation defining second pin 57, the second pin 57 lying to the other side of the plate portion 51 relative to the first pin 53, the axis of the second pin 57 extending generally parallel to the plane including the front wall engageable plate portion 51. The front wall engageable plate portion 51 further includes a plurality of fastener receiving apertures 58 which facilitate assembly of the mounting plate to a structure relative to which an element is to be hinged.

In further accordance with the invention, a longitudinally extending hinge link 60 in the form of a third class lever has one end 61 pivotally mounted relative to the mounting plate 50 by the axis of rotation defining pin 57 establishing a hinge axis for the hinge link 60. The hinge link 60 is formed by a first side member 63 and second side member 64 extending parallel to and spaced from each other. The end 61 of the hinge link 60 receives between the members 63, 64 the distal end of the hinge link pivot-providing arm 56, such distal end of the arm being sandwiched between the members 63, 64 at the end 61, with the second pin 57 extending through appropriate apertures in the members 63, 64 and the arm 56. The other end 62 of the hinge link 60 is comprised of the members 63 and 64 joined together by, for example, one or more spot welds. It can be seen that pivotal movement of the hinge link 60 to and away from the stop means 54 in the illustrated form of roller is provided. It can further be seen that the hinge link 60 is supported by the mounting plate 50 at a location spaced from and below the horizontal position of the mounting plate supported stop member 54. Between its ends 61, 62, the hinge link 60 includes an axis of rotation defining hinge blade pin 66, the function of which will now be discussed.

In further accordance with the present invention, a hinge blade 70 configured as a bell crank pivotally mounted at the hinge blade pin 66 to the hinge link 60 is provided. The bell crank configured hinge blade 70 acts as a conventional lever having its fulcrum or pivot axis generally at the apex of the angle formed by a first or one arm 72 and a second or other arm 74, the arm 72 being considerably longer than the arm 74, as illustrated, to provide the necessary leverage for effective oven door opening and closing. While the hinge link 60 pivots for movement on the axis of rotation defining second pin 57, the bell crank configured hinge blade 70 pivots for movement on its axis of rotation defining hinge blade pin 66. One arm 72 of the bell crank configured hinge blade extends from the hinge link 60 towards and is engageable with the stop member 54, the arm 72 being biased toward the stop member by the tensioned spring 42 which engages a spring-engaging hook 76 located at the distal end of the arm 72. The other arm 74 of the bell crank configured hinge blade 70 longitudinally extends generally along at least a portion of the longitudinal extent of the hinge link 60 and is sandwiched between the member 63, 64. Also included generally at the distal end of the arm 72, which extends outwardly from the link 60 to a point beyond the stop member 54, is a mounting plate catch 73 which engages a lip 71 of the mounting plate 50 when the hinge link 60 is moved to a generally horizontal position relative to the vertically extending mounting plate 50, such catch 73 limiting the degree of clockwise movement of the hinge link 60, as illustrated in FIG. 2. It is noted that the hinge mechanism of the present invention as illustrated in FIG. 2 is shown in a locked condition wherein the stop member 54 engages a deep recess or locking notch 77 (see FIG. 3) provided by the arm 72. This locking feature will now be discussed.

Figure 3:
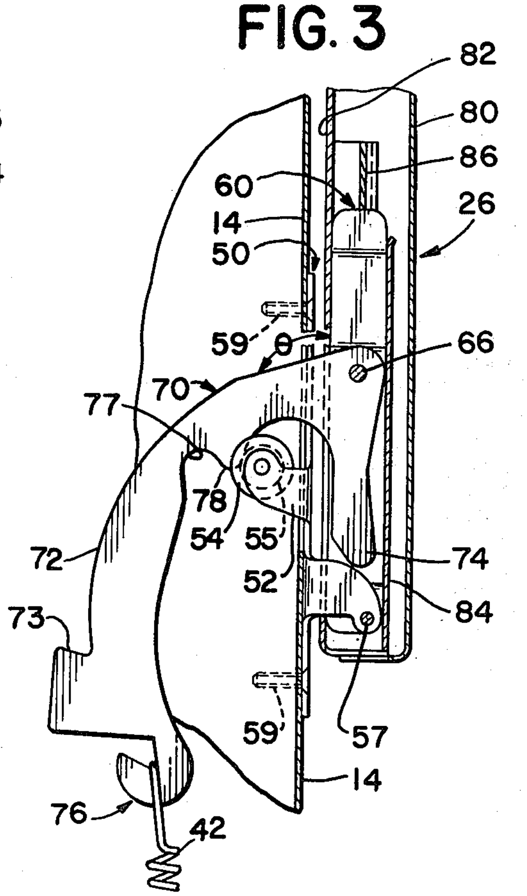
FIG. 3 is a side view of the hinge mechanism of FIG. 2 mounted in a range body with portions cut away, the hinge mechanism supporting a removable oven door.

With particular reference to FIG. 3, the mounting plate 50 is shown in a vertically oriented position fastened to the front wall 14 of the range body in a lower corner area of the oven door 26 as earlier illustrated and discussed with regard to FIG. 1. Suitable fasteners, such as self-tapping sheet metal screws 59, extend through and engage the sidewalls of the fastener receiving apertures 58 (see FIG. 2) in the mounting plate. The front wall 14 includes a suitable aperture positioned to receive the one arm 72 of the hinge blade 70 and the stop-supporting arm 52 including stop member 54 in the preferred form of a flange roller having a load-bearing inner diameter surface 55, as shown in phantom in FIG. 3, the stop member 54 and one arm 72 being located inboard of the front wall 14 within the range body. The oven door 26 includes an outer oven door wall 80 and an inner oven door wall 82 typically formed of sheet metal, the walls 80, 82 being parallel to and spaced from each other, as illustrated. In particular, the lower corners of the oven door 26 include an intermediate channel-forming flange 84 and a hinge link stop projection 86. The flange 84 and the inner oven door wall 82 are spaced from each other by a distance generally equal to the width of the hinge link 60, wherein the hinge link 60 slides into the channel formed by the flange 84 in the inner oven door wall 82 until it meets and abuts the hinge link stop 86. Thus, the oven door 26 is slidingly engaged with and supported by the hinge link 60 located at each lower corner of the door 26. With the oven door 26 installed on the hinge link 60, the other arm 74 of the bell crank configured hinge blade 70 is limited in movement to the space between the members 63 and 64 (FIG. 2) such that an angle $\theta$ between the blade 70 and the link 60 as shown in FIG. 3 is minimized. With the other arm 74 of the hinge blade 70 held in general axial alignment with the hinge link 60, the recess or locking notch 77 is held out of engagement with the stop member 54, i.e., the bearing surface 55 of the roller cannot ride into the locking notch 77 as the door 26 is pulled out away from the open face of the oven cavity. It is noted that the hinge blade 70 includes a conventional broil position-establishing detent projection 78 which is adjacent to the locking notch 77 and engageable as a detent means with the stop member 54. When the oven door 26 is slid off the hinge link 60, the other arm 74 of the hinge blade is free to rotate in a counterclockwise direction about the pin 66, wherein the force of the spring 42 holds the stop member 54 in engagement with the locking notch 77 to maintain the hinge link 60 at the partially open position as illustrated in FIG. 2.

Figure 4:
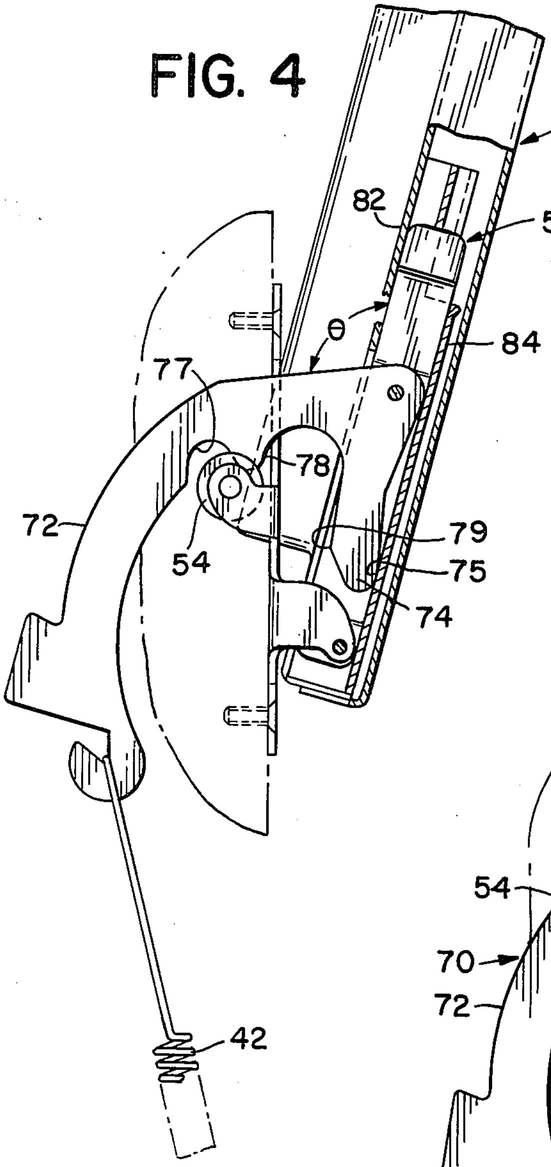
FIG. 4 illustrates the hinge mechanism condition with the oven door in a partially open broil position.

Turning to FIG. 4, the hinge mechanism of the present invention is shown in a partially open broil position established by the detent projection 78, with the oven door still installed on the hinge link 50. It can be seen that the detent projection 78 is able to ride over stop member 54 to close the door 26, since there is some free play or lost motion provided between the inner oven door wall 82 and the inside edge 79 and the other hinge blade arm 74. It can be further seen that the further pivotal movement of the oven door 26 to open it toward a generally horizontal position is possible because the outside edge 75 of the arm 74 bears against the intermediate channel-forming flange 84 as illustrated to maintain a minimized angle $\theta$ as illustrated in FIG. 4, and thereby hold the locking notch 77 out of engagement with the stop member 54 in the illustrated form of a roller. At the illustrated broil position of the partially open door 26 as illustrated in FIG. 4, the recess or locking notch 77 is generally aligned with the stop member 54.

Figure 5:
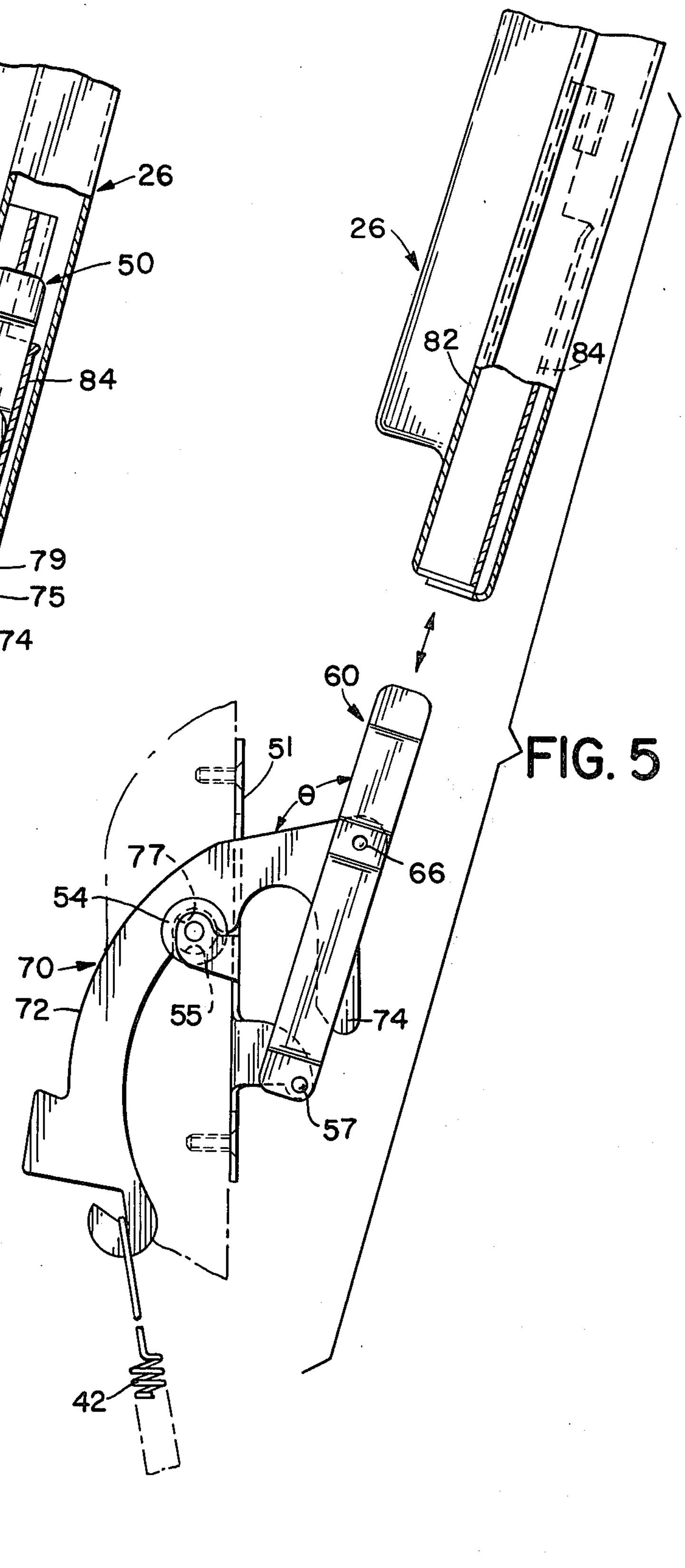
FIG. 5 illustrates the hinge mechanism after removal of the oven door.

Turning to FIG. 5, it can be seen that as the oven door 26 (at its broil position) is lifted up and pulled off the hinge link 60, the force of the tensioned spring 42 snaps the hinge blade arm 72 toward the roller bearing surface 55, which engages the recess or locking notch 77, such pivotal movement of the bell crank configured hinge blade 70 being possible due to the unlimited movement of the arm 74 no longer interfered with or impeded in movement by stop means in the form of a channel-forming flange 84 of the door 26. It can be seen that a maximum angle $\theta$ between the arm 72 and the hinge blade 60 is established and the hinge mechanism is locked in position, the arm 74 now being in a generally non-axially aligned condition with the hinge link 60, a portion of the arm 74 projecting outside the area between the member 63, 64 (see FIG. 2).

Upon reinstallation of the oven door 26, the arm 74 is forced back into general axial alignment with the hinge link 60, wherein the arm 72, against the force of the tension spring 42, lifts off the stop member 54 to once again permit free pivotal movement of the hinge link 60, and thus the door 26. Preferably, the depth of the recess or locking notch 77 is at least equal to one-half the diameter defining the load bearing surface 55 of the stop member 54 to ensure positive locking.

The illustrated hinge mechanism in accordance with the present invention has been found to be highly reliable and rugged, and furthermore is inexpensive to manufacture.

While preferred embodiments of this invention are illustrated, it should be understood that various modifications and rearrangements of parts may be resorted to without departing from the scope of the invention as disclosed and claimed herein.

What is claimed is:

1. A hinge mechanism comprising:

a mounting plate supporting a stop member fixed relative to the mounting plate;

a longitudinally extending hinge link having one end pivotally mounted to and supported by the mounting plate at a location spaced from the position of the mounting plate supported stop member, the hinge link being pivotally movable toward and away from the stop member;

a hinge blade configured as a bell crank pivotally mounted intermediate its ends to the hinge link at a location spaced from said pivotally mounted end, one arm of said hinge blade extending from the hinge link toward the stop member, said one arm being biased toward the stop member and including a recess aligned with the stop member when the hinge mechanism is in at least a partially open position, the other arm of said hinge blade extending generally along at least a portion of the longitudinal extent of the hinge link, wherein axial alignment of said other arm and the hinge link holds the recess out of engagement with the stop member when the hinge link is moved toward and away from the stop member, a predetermined degree of nonaxial alignment between said other arm and the hinge link permitting engagement of the recess with the stop member to lock the hinge mechanism in place at said partially open position.

2. A hinge mechanism according to claim 1, wherein the distal end of said one arm extends beyond the stop member, the distal end being adapted to anchor one end of a tensioned spring means to supply the biasing of one arm toward the stop member.

3. A hinge mechanism according to claim 2, wherein the length of said one arm is greater than the length of said other arm.

4. A hinge mechanism according to claim 1, wherein the hinge link includes a pair of longitudinally extending parallel members spaced from each other, said other arm being sandwiched between the parallel member, said other arm being limited in movement to the area between the parallel members to hold the recess out of engagement with the stop member.

5. A hinge mechanism for pivotally mounting a removable oven door on a domestic range comprising:

a fixed stop member;

a hinge link having one end pivotally mounted at a location fixed relative to the stop member, the hinge link being pivotally movable toward and away from the stop member;

a hinge blade configured as a bell crank pivotally mounted intermediate its ends to the hinge link, one arm of said hinge blade being spring-biased toward and engageable with the stop member as the hinge link pivotally moves toward and away from the stop member, said one arm including a recess sized to receive the stop member, the other arm of said hinge blade being limited in movement by the oven door wherein the recess is held out of engagement with the stop member when the recess and the stop member are in an aligned condition when the oven door is in a partially open position, removal of the oven door at said partially open position allowing free movement of said other arm to permit the stop member to engage the recess to lock the hinge in position.

6. A hinge mechanism according to claim 5, wherein the stop member is a roller.

7. A hinge mechanism according to claim 6, wherein the depth of the recess is not less than one-half the diameter of the roller.

8. A hinge mechanism according to claim 5, wherein the length of said one arm providing the recess is greater than the length of said other arm limited in movement by the oven door.

9. In a domestic range having a generally cubical oven cavity with an open face closable by a pivotally movable generally rectangular oven door mounted on the range by a pair of hinge mechanisms each located at a respective one of the lower corners of the oven door, each hinge mechanism including:

a mounting plate fixed to the front wall of the range body, the mounting plate supporting a roller, the roller being located generally at the mid-portion of the mounting plate and inboard of the front wall of the range body, the roller being fixed relative to the mounting plate, the axis of rotation of the roller extending generally parallel to the front wall of the range body;

an elongated hinge link having one end pivotally mounted to and supported by the mounting plate at a location below the mounting plate supported roller, the hinge link being pivotally movable toward and away from the roller, the movement of the link being in a plane perpendicular to the axis of rotation of the roller;

a hinge blade configured as a bell crank pivotally mounted to the hinge link at a location spaced from its pivotally mounted end, pivotal movement of the hinge blade relative to the hinge link being in said plane perpendicular to the axis of rotation of the roller, one arm of the bell crank configured hinge blade extending toward the roller and engageable with it as the hinge link pivotally moves toward and away from the roller, said one arm being spring-biased toward the roller, said one arm including a recess sized to receive the roller, the other arm of the bell crank configured hinge blade longitudinally extending generally along at least a portion of the longitudinal extent of the hinge link wherein generally axial alignment of said other arm is maintained by stop means carried by the oven door to limit the pivotal range of movement of the bell crank configured hinge blade relative to the hinge link wherein the recess provided by said spring-biased arm is held out of engagement with the roller, the recess and the roller being in aligned condition when the oven door is in a partially open condition, removal of the oven door to said partially open position moving said stop means out of interfering relation with said other arm to permit said other arm to move to a non-axial aligned position with the hinge link wherein the roller engages the recess to lock the hinge at said partially open position.

10. A hinge mechanism according to claim 9, wherein the hinge link is slidably engageable with a channel means at the lower side edge of the oven door, the channel means having at least one side wall functioning as a stop means to limit the range of axial movement of said other arm to hold the recess out of engagement with the roller, removal of the oven door by applying an upward pulling force thereto slidably disengaging the channel means from the hinge link thereby permitting the bell crank configured hinge blade to freely pivot wherein the recess engages the roller to positively lock the hinge mechanism in position.

11. A hinge mechanism according to claim 10, wherein the recess and the roller are in an adjacent, generally aligned position relative to each other when the oven door is at a partially open broil position.

* * * * *